C. KLAUBERG.

TUMBLER WASHER.

No. 11,581. Reissued Jan. 5, 1897.

Witnesses.
J. H. Shumway
Jesse S. Alling

Charles Klauberg
Inventor.
By attys
Earle & Seymour

THE NORRIS PETERS CO., PHOTO-LITHO., WASHINGTON, D. C.

UNITED STATES PATENT OFFICE.

CHARLES KLAUBERG, OF NEW HAVEN, CONNECTICUT.

TUMBLER-WASHER.

SPECIFICATION forming part of Reissued Letters Patent No. 11,581, dated January 5, 1897.

Original No. 550,794, dated December 3, 1895. Application for reissue filed March 5, 1896. Serial No. 582,012.

*To all whom it may concern:*

Be it known that I, CHARLES KLAUBERG, of New Haven, in the county of New Haven and State of Connecticut, have invented a new Improvement in Tumbler-Washers; and I do hereby declare the following, when taken in connection with the accompanying drawings and the letters of reference marked thereon, to be a full, clear, and exact description of the same, and which said drawings constitute part of this specification, and represent, in—

Figure 1:
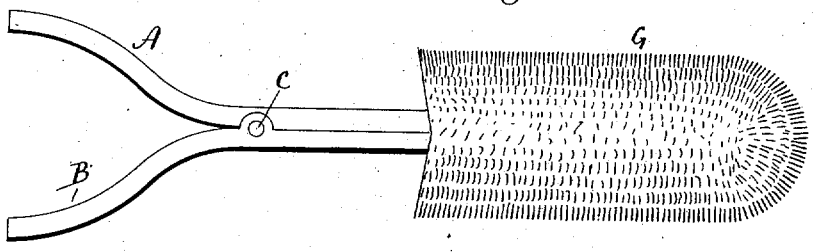
Figure 2:
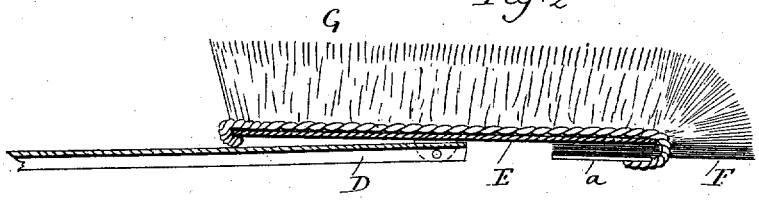
Figure 3:
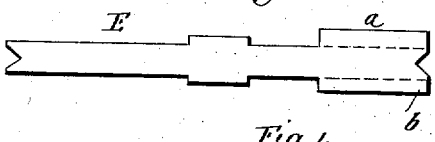
Figure 4:
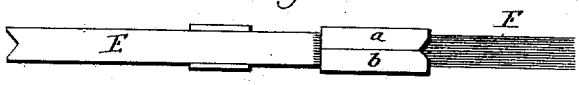

Figure 1, a side view of a tumbler-washer; Fig. 2, a sectional view through one of the brushes, brush-carrier, and outer end of one of the handles; Fig. 3, a detached view of one of the carriers, showing the flaps in the open position; Fig. 4, a similar view showing the flaps as engaged with a bunch of bristles.

This invention relates to an improvement in tumbler-washers, and is an improvement upon the device described in an application filed by me March 14, 1895, Serial No. 541,748. The device of that application consisted of a pair of handles pivoted together and each constructed with an arm, a brush-carrier pivotally connected at the end of each arm, and brushes adapted to be engaged with said arms. This present invention is also applicable to tumbler-washers which employ similar brush-carriers. The brushes employed in connection with washers of this character are formed of bristles twisted into a backing of wire, the ends of the said wire being engaged with the brush-carrier. As the ends of the wire are bent the bristles at that point are separated, so that but few are presented at the ends of the device, where actually the greatest number is required.

The object of this invention is to increase the number of bristles at the end of the brush; and it consists in applying to the carriers a bunch of bristles which will project beyond the ends and commingle with the bristles of the brushes to present a sufficient number at the ends of the device, and as more fully hereinafter described, and particularly recited in the claims.

A B represent the handles, pivoted together, as at C, and each constructed with an arm D, which projects beyond the pivot, as in my previous application. To the outer ends of the arms brush-carriers E are pivoted, which are formed from sheet metal, preferably notched at their ends, and constructed at the outer end with integral flaps *a b*. A bunch of bristles F is placed upon the outer end of the carrier and the flaps *a b* turned over upon their ends to permanently secure them in position, as shown in Fig. 4. The brushes G consist of bristles wound into a backing of wire, the ends of which are turned inward to engage with the ends of the carriers, the wires at the outer end passing through the bristles F and so that the said bristles appear to form an integral part of the brush.

It will be understood, without illustration or description, that a spring is arranged upon the pivot C, the tendency of which is to hold the brushes together, yet permit them to be separated to force the bristles against the sides of the article to be cleaned. It will thus be seen that a large mass of bristles is presented at the ends of the brushes, where the greatest wear occurs.

It is apparent that in carrying out my invention some changes from the construction herein shown may be made, and I would therefore have it understood that I do not limit myself to the exact construction shown and described, but hold myself at liberty to make such variations therein as fairly fall within the spirit and scope of my invention.

I claim—

1. In a device for cleaning tumblers, the combination with two handles pivoted together, and each constructed with an arm, of two brush-carriers pivotally connected respectively with said arms, bristles secured to the outer ends of said carriers, and brushes connected with said carriers, substantially as described.

2. In a device for cleaning tumblers, the combination with two handles pivoted together, and each constructed with an arm, of two brush-carriers pivotally connected respectively with said arms, and formed at their outer ends with flaps, bristles secured to the outer ends of said carriers by said flaps, and brushes connected with said carriers, substantially as described.

3. In a device for cleaning tumblers, the combination with two handles pivoted together and each constructed with an arm, of two brush-carriers pivotally connected respectively with said arms, and constructed at their outer ends with flaps, and having their ends notched, bristles secured to the outer ends of said carriers by said flaps, and brushes constructed at their ends with retaining-fingers which enter the notches in the ends of the carrier, and which at the outer ends pass through the bristles on the end of the carrier, substantially as described.

4. The combination with a handle, of a brush-carrier pivotally connected therewith, bristles mounted in the end of said carrier projecting in line therewith and beyond the end thereof, and a brush removably applied to the said carrier, its outer end passing through the bristles on the end of the carrier which reinforce and support the bristles at the outer end of the brush, substantially as described.

In testimony whereof I have signed this specification in the presence of two subscribing witnesses.

CHARLES KLAUBERG.

Witnesses:
FRED C. EARLE,
JESSIE S. ALLING.